Feb. 9, 1971          B. M. MARCAN          3,561,158
                         SEED TRAYS
Filed Oct. 8, 1968                    2 Sheets-Sheet 1
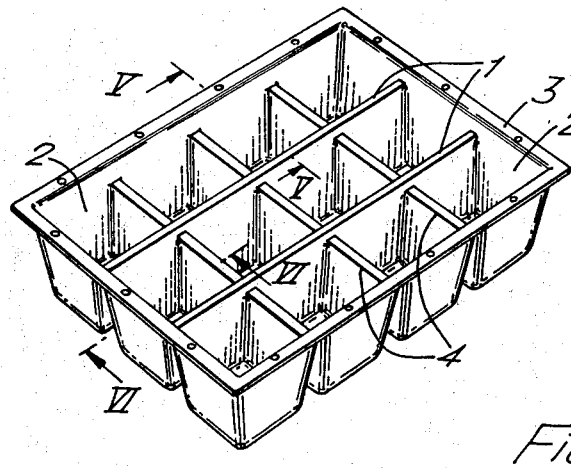
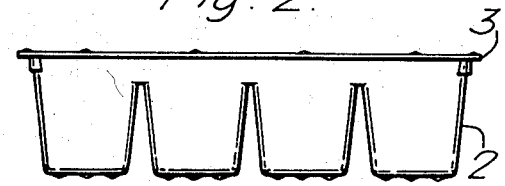
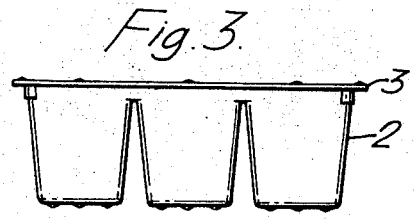
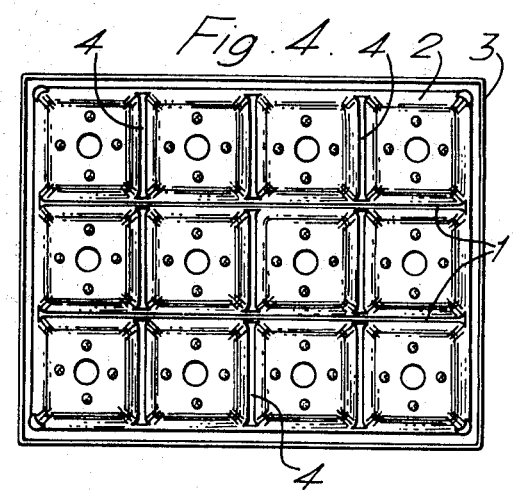
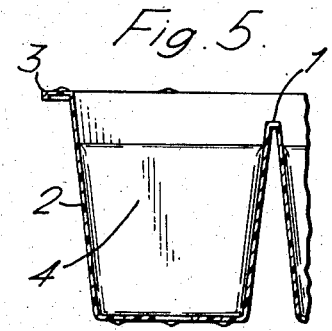
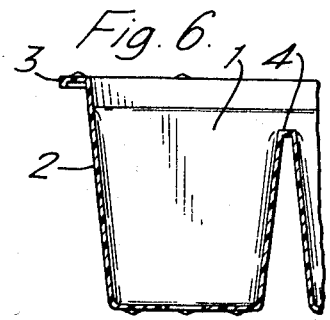
Inventor:
BETTY MURIEL MARCAN
by
Attorney Feb. 9, 1971 B. M. MARCAN 3,561,158
SEED TRAYS
Filed Oct. 8, 1968 2 Sheets-Sheet 2
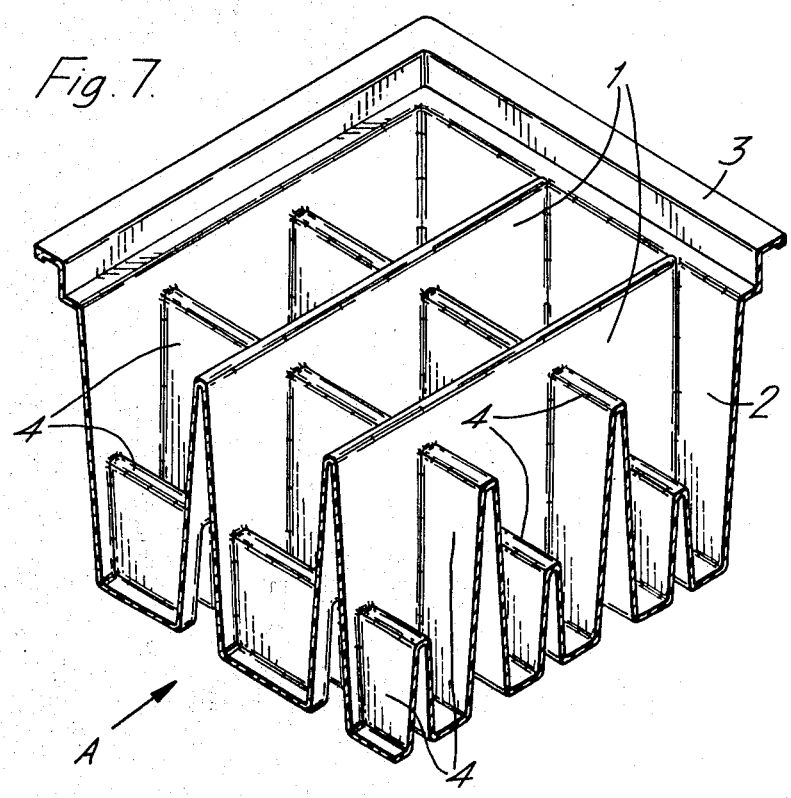
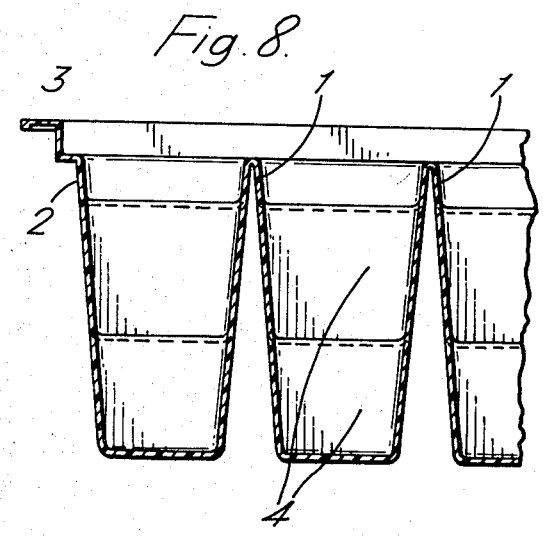
Inventor:
BETTY MURIEL MARCAN
by
Attorney

United States Patent Office 3,561,158
Patented Feb. 9, 1971

3,561,158
SEED TRAYS
Betty Muriel Marcan, Burrough's Grove, Pump Lane,
Little Marlow, Buckinghamshire, England
Filed Oct. 8, 1968, Ser. No. 765,835
Claims priority, application Great Britain, Oct. 9, 1967,
46,067/67
Int. Cl. A01g 9/02; B65d 21/02, 1/36
U.S. Cl. 47—34.13                                  5 Claims

ABSTRACT OF THE DISCLOSURE

A seed tray formed from synthetic plastics material and comprising a plurality of small containers joined together, the outside and intermediate dividing walls defining the containers being of different depths whereby flexing of the tray as a whole is inhibited or limited to a substantial degree.

BACKGROUND OF INVENTION

This invention relates to seed trays of the kind comprising a plurality of small containers joined together to form "a tray" which has an overall size similar to that of a conventional wooden seed box. Seed trays of this kind are conveniently formed from synthetic plastics materials by a vacuum moulding process. They are, however, thin and flexible so that they are far from easy to handle. A flat supporting surface is required and unless proper care is taken these seed trays can suddenly buckle up, whereby soil and plants are spilled out, the plants possibly being damaged. This can be obviated to some extent by providing additional supporting trays or boxes. It will be realised, however, that to provide each seed tray with its own supporting tray or box merely increases overall costs and the problem of handling and storage generally.

The object of the present invention is to overcome or minimise the disadvantages referred to above.

SUMMARY AND DESCRIPTION OF INVENTION

According to this invention there is provided a seed tray formed from synthetic plastics material and comprising a plurality of small containers joined together, the outside and intermediate dividing walls defining the containers being of different depths whereby flexing of the tray as a whole is inhibited or limited to a substantial degree.

BRIEF DESCRIPTION OF DRAWINGS

In the accompanying drawings:
FIG. 1 is a perspective view from above of a seed tray in accordance with a preferred embodiment of this invention,
FIGS. 2, 3 and 4 are respectively a side elevation, an end elevation and a plan view of the seed tray shown in FIG. 1,
FIG. 5 is a section on the line V—V in FIG. 1,
FIG. 6 is a section on the line VI—VI in FIG. 1,
FIG. 7 is a part-perspective part-sectional view, drawn on an enlarged scale, of a modified form of seed tray, and FIG. 8 is a view taken in the direction of the arrow A in FIG. 7.

DESCRIPTION OF SHOWN EMBODIMENTS

The seed tray shown in FIGS. 1 to 6 is conveniently formed from either a vacuum moulding or an injection moulding process. It is of overall rectangular form with spaced parallel dividing walls extending in both directions. The walls 1 extending in one direction are continuous but are of slightly less depth than the outside wall 2 of the tray when considered as a whole, such outside wall being formed with an outwardly turned lip 3. The walls 4 extending in the other direction are interrupted by and are in turn of slightly less depth than the said continuous walls 1. The intervening walls 1 and 4 are double, that is they are of deep inverted channel shape in transverse section; thus each container does in effect have its own independent walls.

Due to the fact that the depths of the outside wall 2 and the intervening walls 1 and 4 are each different there is no common plane about which the seed tray as a whole can be flexed. Slight flexing is possible along the lines of the continuous walls 1 but transversely thereto flexing is substantially inhibited.

With a seed tray made as above described, individual containers may be rather too small for some purposes, and a modified form of seed tray is shown in FIGS. 7 and 8. In this, alternate walls 4 are made about half the height of the others. Individual containers are thus defined between the walls 4 of greater height and the walls 1.

A plurality of trays as described above can readily be nested or stacked together for storage, transport and other purposes, thus providing for a substantial saving in space.

I claim:
1. An integral, compartmented seed tray comprising:
   a generally upwardly and outwardly extending outside wall having a continuous, circumferential upper portion and defining an interior space;
   a continuous circumferential flange connected to said upper portion of said outside wall and extending outwardly therefrom;
   a plurality of intersecting dividing walls of inverted channel shape in transverse section intermediate and connected to said outside wall,
   said dividing walls dividing said interior space into a plurality of individual compartments each having independent walls,
   each of said compartments having a bottom wall integral with said dividing walls,
   the shapes of said outside and dividing walls being such that identical trays can be nested one above the other; and,
   said dividing walls including a first group of spaced, generally parallel walls intersecting a second group of spaced, generally parallel walls,
   the height of all of the walls of one of said groups of walls being greater than the heights of all of the walls of the other of said groups of walls,
   the height of all of said dividing walls differing from the height of said outside wall,
   whereby the dividing walls, the outside wall and the flange cooperate to provide a rigid overall tray structure.

2. The seed tray of claim 1 wherein the height of said outside wall exceeds the height of all of said dividing walls.

3. The seed tray of claim 1 wherein each of said individual compartments is substantially square.

4. The seed tray of claim 1 wherein the height of alternate walls of said second group of walls is approximately one-half the height of the other walls of said one of said first and second groups.

5. The seed tray of claim 1 wherein said outside wall encloses a generally rectangular interior space and said dividing walls extend between said outside walls in directions mutually at right angles, an upper portion of each of the dividing walls of said one group of walls being continuous, the tops of said portions being substantially coplanar.

References Cited
UNITED STATES PATENTS

| | | | |
|---|---|---|---|
| 3,502,241 | 3/1970 | Smith | 220—23.6 |
| 2,758,750 | 8/1956 | Stroop | 220—21X |
| 3,203,573 | 8/1965 | Rowe | 220—23.6 |
| 3,403,834 | 10/1968 | Donovan | 229—2.5 |

FOREIGN PATENTS 1,437,556   3/1966   France.

ROBERT E. BAGWILL, Primary Examiner

U.S. Cl. X.R.

220—23.6